(12) United States Patent
Chen (10) Patent No.: US 9,874,334 B2
(45) Date of Patent: Jan. 23, 2018

(54) MODULARIZED SMART HOME-CARE LIGHTING DEVICE

(71) Applicant: Kaipo Chen, Taoyuan (TW)

(72) Inventor: Kaipo Chen, Taoyuan (TW)

( * ) Notice: Subject to any disclaimer, the term of this patent is extended or adjusted under 35 U.S.C. 154(b) by 0 days.

(21) Appl. No.: 15/219,285

(22) Filed: Jul. 26, 2016

(65) Prior Publication Data

US 2016/0334082 A1    Nov. 17, 2016

Related U.S. Application Data

(63) Continuation-in-part of application No. 14/258,029, filed on Apr. 22, 2014.

(30) Foreign Application Priority Data

Mar. 12, 2014  (CN) .......................... 2014 1 0089724
May 12, 2016  (CN) .......................... 2016 1 0316397

(51) Int. Cl.
*F21V 17/00*    (2006.01)
*H04N 5/225*    (2006.01)
(Continued)

(52) U.S. Cl.
CPC ........ *F21V 17/002* (2013.01); *F21V 33/0052* (2013.01); *F21V 33/0056* (2013.01); *F21V 33/0076* (2013.01); *G08B 5/36* (2013.01); *G08B 13/19619* (2013.01); *H04N 5/2251* (2013.01); *H04N 5/2252* (2013.01); *H04N 5/2256* (2013.01); *H04N 5/2257* (2013.01); *H04N 5/23238* (2013.01); *H04N 7/183* (2013.01); *F21S 8/06* (2013.01); *F21S 9/02* (2013.01); *F21V 23/0471* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS 6,812,970 B1 * 11/2004 McBride .......... G08B 13/19619
                                                      348/151
7,327,254 B2 *  2/2008 Chen ................... F21V 23/0471
                                                      340/321

(Continued)

*Primary Examiner* — David N Werner
(74) *Attorney, Agent, or Firm* — Leong C. Lei (57) ABSTRACT

A modularized smart home-care lighting device includes a lighting device including a base and a swappable assembly. The base is provided therein with a plurality of LEDs and an insertion slot. The insertion slot allows for installation and connection of a swappable assembly that has a camera for panoramic surveillance and monitoring. The camera has a circumference in which a detection module that detects an environment outside the lighting device and an ancillary module corresponding to the detection module to provide reminder and alarm. The swappable assembly is readily inserted into the base to establish secured connection therewith. Through electrical connection with the main control panel in the swappable assembly, the lighting device is allowed for expansion for diverse functions, which in combination with automatic connection with household electrical appliances, allows family members to be well taken care of to achieve the purpose of smart home care.

9 Claims, 13 Drawing Sheets

(51) Int. Cl.
*H04N 7/18* (2006.01)
*F21V 33/00* (2006.01)
*G08B 5/36* (2006.01)
*G08B 13/196* (2006.01)
*H04N 5/232* (2006.01)
*F21S 8/06* (2006.01)
*F21S 9/02* (2006.01)
*F21V 23/04* (2006.01)
*F21Y 115/10* (2016.01)
*F21Y 103/10* (2016.01)

(56) References Cited

U.S. PATENT DOCUMENTS

| | | | |
|---|---|---|---|
| 7,467,881 B2* | 12/2008 | McMillen | F21S 8/026 362/147 |
| 2004/0201985 A1* | 10/2004 | Kung | G09G 3/3208 362/183 |
| 2008/0246844 A1* | 10/2008 | Chan | F21S 9/022 348/152 |
| 2009/0310342 A1* | 12/2009 | Chang | F21L 4/027 362/205 |
| 2010/0148672 A1* | 6/2010 | Hopper | F21V 23/0435 315/113 |
| 2016/0234414 A1* | 8/2016 | Chen | H04N 7/183 |

* cited by examiner

MODULARIZED SMART HOME-CARE LIGHTING DEVICE

CROSS-REFERENCE TO RELATED APPLICATION

This is a continuation-in-part of co-pending U.S. patent application Ser. No. 14/258,029 filed on Apr. 22, 2014 and owned by the present applicant.

(a) TECHNICAL FIELD OF THE INVENTION

The present invention relates generally to a modularized smart home-care lighting device, which comprises a swappable assembly having multiple functions and readily combinable with a lighting fixture to allow for expansion of utilization range in a household environment and improve overall utilization thereof.

(b) DESCRIPTION OF THE PRIOR ART

With the light-emitting diode (LED) technology getting mature in various applications, in addition to the development of techniques regarding energy saving and lighting, manufacturers also focus on the development of styles and functions of LED related devices available in the market to provide multiple functions associated therewith. One of the hottest applications is products that combine the Wi-Fi technology that has been quite mature for target monitoring through remote operations. Most of the families have elder family members or young children. Most of the adults have to leave home for working and it is generally not possible for them to watch and take care of these family members from time to time. Although attendants for the elders and/or young children may be available, but the cost may not be affordable to all the families.

Products of the kind discussed above generally have individual specifications according to model and functionality thereof. In order to add or remove certain features for products to be sold in different areas, manufacturers often need to re-design the entire product and this is generally a waste of money, time and labor.

In view of the above problem, the present invention is made to help alleviate or overcome such problems.

SUMMARY OF THE INVENTION

The present inventor has been working in the field of research and study and manufacture of LED (Light-Emitting Diode) for years and have previously proposed various surveillance/monitoring systems that are combined with lighting devices and have collected experiences of use and feed back from users of similar devices of this kind so as to full aware of the needs of the general consumers in this respect.

For example, US Patent Publication No. 2008/0177646 A1 discloses a work site remote monitoring and employee time tracking system, wherein image of surveillance, together with on-site biometric scanning data, is transferred through a network to a management end in order to determine the movement and behavior of the employees for the purpose of management. Such a system needs an additional device used in combination therewith, making it imperfect and inconvenient in use. Further, Japanese Patent Application No. 2012-22579 discloses an LED lighting device in which a standing wave radar is included for detecting the distance and biological or physiological conditions of a human body for driving a light source and an alarm, and is applicable to buildings, transportation vehicles, and even roads. However, a major drawback is that efficient and accurate detection of abnormality of a human body is generally not available and the range of detection is generally short, making it difficult for applications in a household or interfering environment.

In addition to combination of a lighting device with multiple known techniques of detection and remote surveillance and monitoring, the present invention uses a modularized structural design to allow a manufacture end to easily expand or subtract functions in a flexible manner by means of installation of different modules for products of different models so as to achieve the purpose of easy maintenance and also help maintain consistency of outside appearance in expanding the functions thereof, making it more convenient in practical applications.

The present invention provides a modularized smart home-care lighting device, which comprises: a base comprising a plurality of light-emitting diodes (LEDs). The base is provided therein with an insertion slot for hot pluggability or hot swappability in order to couple with a swappable assembly featuring panoramic video/image recording. The swappable assembly comprises a detection module and an ancillary arranged in a circumference of a camera and electrically connected with a main control panel, so that through connection and retention with the base by means of the insertion slot, electrical power can be supplied to synchronously drive the operations of related modules and related information can be transmitted to the main control panel to conduct a corresponding operation in response thereto.

The present invention uses a structure that is easily connectable and disconnectable to make function and maintenance thereof superior to similar products and also comprises a swappable assembly, which through connection arrangement may electrically drive all sorts of function and allows information of an external environment so acquired to be transmitted to the main control panel for decision making for applications, and being assisted by connection with related household appliances to make expansion of household environment perfect in an intelligent arrangement.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Better understanding of the present invention can be achieved according to a general detailed description of the present invention, as well as a preferred feasible embodiment thereof, in combination with the attached drawings. The present invention provides a modularized smart home-cue lighting device.

Figure 1:
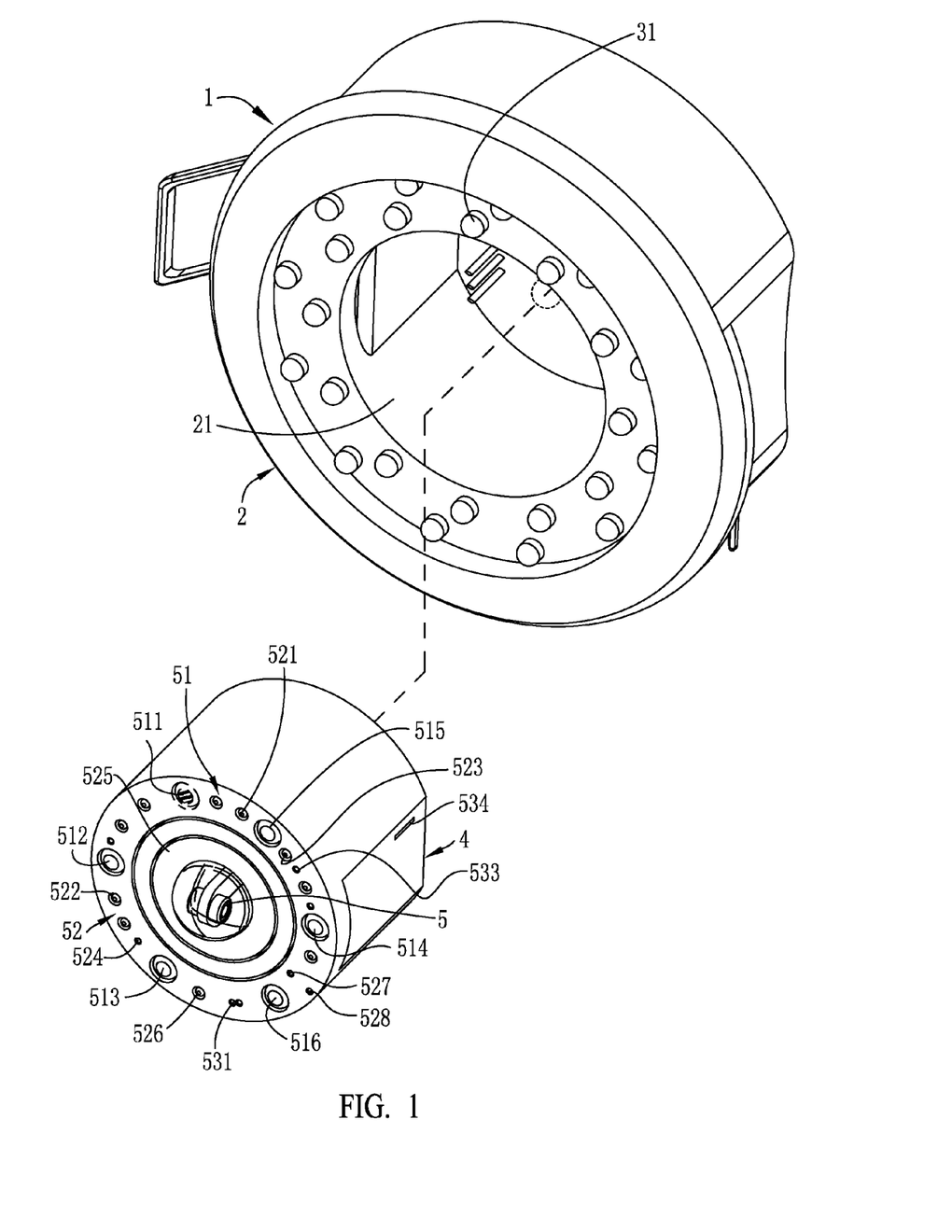
FIG. 1 is a schematic view of the present invention.
Figure 2:
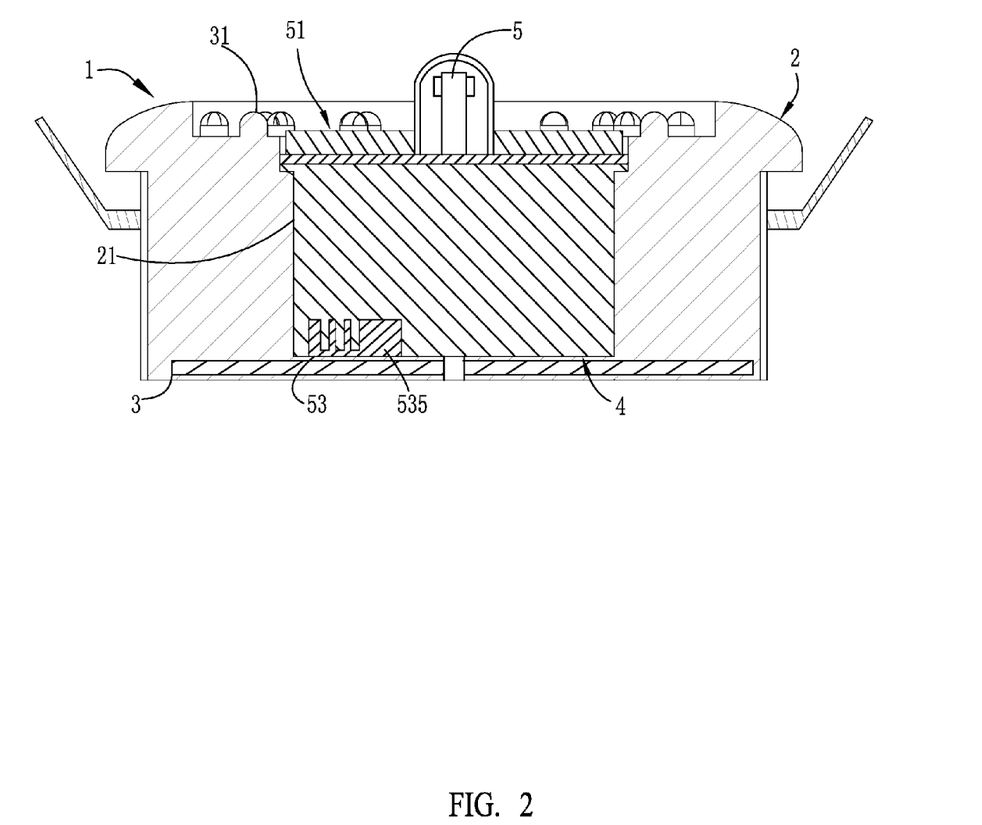
FIG. 2 is a schematic view illustrating inside structure of the present invention.

Shown in FIGS. 1-2 comprise: a lighting device (1), which comprises a base (2) and a swappable assembly (4). The base (2) is provided, in a central portion thereof, with contact terminals for connection with a power supply in order to provide electrical power necessary for the operations of the base (2) and the swappable assembly (4). The base (2) has a surface comprising at least a part that comprises a cover that is light transmittable, the cover being integrally formed with the lighting device (1), or being alternatively of a separate design, or being further alternatively totally omitted, having a primary design purpose for allowing light to project outward from the interior, but not limited to the means discussed and mentioned above. The base (2) is provided therein with plurality of light-emitting diodes (LEDs) (31) and an insertion slot (21) that allows for hot pluggable operation so that the swappable assembly (4) is insertable into the insertion slot (21) of the base (2). The swappable assembly (4) comprises a main control panel (3), and the swappable assembly (4) is provided at a front end of the interior thereof, with a camera (5) capable of surveillance and monitoring through panoramic or omni-directional image/video recording. A specific way of embodying the camera (5) for the desired functions may be achieved with a measure involving at least two lenses or a measure having just one single lens for capturing multiple targets, but is generally not limited thereto. The camera (5) is provided, on a circumference in a circumferentially distributed manner, with a detection module (51) and an ancillary module (52). When the swappable assembly (4) is embedded in and connected with the insertion slot (21) of the base (2), electrical connection thereof with illumination allows the camera (5) to conduct panoramic surveillance or monitoring, providing an excellent expansion of the range thereof with adjustment of angular position being saved and omitted, and also for synchronously driving the detection module (51) and the ancillary module (52) to transmit information to the main control panel (3), allowing the main control panel (3) to provide, in return, corresponding operations so as to allow the entirety of the lighting device to easily expand and select multiple functions. Further, the base (2) may calculate, through installation and positioning, consumed power and assess power expense according to regional electrical power fair, and also allowing for transmission of the related information through APP, thereby improving the utilization thereof.

The detection module (51) comprises: a living organism identification assembly (511) that detects a location and body performance of a target object, a humidity/temperature sensor assembly (512) that detects temperature/humidity of the environment outside the lighting device (1), a smoke sensor assembly (513) that detects smokes in the environment outside the lighting device (1), a gas sensor assembly (514) that detects harmful gases outside the lighting device (1), an air sensor assembly (135) that detects contents of suspending particles in the atmosphere of the environment outside the lighting device (1), and a body temperature sensor assembly (516) that detect body temperatures of family members in the environment and outside the lighting device (1), wherein all the detection modules (51) feed information acquired thereto back to the main control panel (3) for identification of the set standards of the environment thereof for the purpose of activating the corresponding ancillary module (52).

Being classified according the functionality, the ancillary module (52) provides functions of reminder, alarm and transmission. The reminder function involves an IP setting indicator (521) corresponding to reminder of instruction operation, a temperature/the humidity indicator (522) corresponding to the humidity/temperature sensor assembly (512), a gas indicator (524) corresponding to the gas sensor assembly (514), an air quality indicator (525) corresponding to the air sensor assembly (515), a smoke indicator (526) corresponding to the smoke sensor assembly (513), and a body temperature indicator (527) corresponding to the body temperature sensor assembly (516); the alarm function involves a smoke/gas alarm light (523) corresponding to the smoke sensor assembly (513) and the gas sensor assembly (514) and a body temperature alarm light (528) corresponding to the body temperature sensor assembly (516). All the above-mentioned indicators/lights are driven to give off light for reminder or alarm through determination made according to information acquired by the detection module (51) and fed back to the main control panel (3). The number of the indicators/lights can be increased or decreased according to actual needs or can be variably set during the manufacturing thereof, not limited to any specific arrangement, provided the indications and lighting of the indicators/lights are clear.

However, for the function or operation as ancillary transmission or for assisting transmission, what can be provided on the base (2) or the swappable assembly are an infrared transceiver (531) that is provided for transmission and receiving external signals and a speaker (532) and a microphone (533) provided for the purposes of receiving, recognition, voice control, and audio effect of broadcasting, and a memory card slot (534) that is provided for the purpose of transferring and storing (or downloading) images captured by the camera (5) for easy carrying or for the purposes of providing extension of time of image/video recording, but not limited thereto. In addition, the number of the above-described items or articles or devices is not limited to one and can be varied according to actual needs or can be variably set during the manufacturing thereof.

The main control panel (3) is further provided thereon with a microprocessor and a chip for transmission of information and relies on power supplied from a power supply board (53) to be driven for operation. The chip is operable for establishing connection through means including WIFI, LIFI, Bluetooth, Z-WAVE, ZigBee, and wireless control with for example a tablet computer, a smart phone, a handheld or wearable device, an in-vehicle infotainment (IVI) system, or a device, which is operable for collecting and storing data related to a user to establish a personal health record (PHD). The main control panel (3), under the condition that the swappable assembly (4) is inserted into and coupled with the base (2) to connect with lighting, may conduct an operation of identifying the information acquired and conducting an operation of comparison of information supplied thereto with preset thresholds loaded in the microprocessor for processing and identifying feedback information in order to activate or de-activate related function.

The LEDs (31) can be involved with solely warm light, solely cold light, or a combination of wane light and cold light and as a primary way of embodiment in the present invention, the LEDs (31) are arranged on the base (2) at locations in a circumference around the insertion slot (21) and distributed in a circumferentially arranged manner, but the arrangement can be varied according to actual needs or can be variably set during the manufacturing thereof. And, arranged on the swappable assembly (4) in an outer circumferential area of the camera (5) are the air quality indicator (525) and a secondary illumination light. The secondary illumination light is in the form of a ring arranged in an outer annular portion around the air quality indicator (525) to form dual-layer circumferential arrangement. Further, the secondary illumination light is provided, in the interior thereof, with a light sensor such that automatic regulation of light may be achieved by means of the main control panel (3) to correspond to the environment, or opening/closing window covering or may be controlled and operated by an input instruction supplied through external connection and may store and use preferential settings of various users, such as operating in combination with a mobile application (APP) of a mobile phone to change to scenario lighting or to easily vary the surrounding atmosphere for specific holidays or festivals. The above-described structure can be varied according to actual needs or can be variably set during the manufacturing thereof and is not limited thereto.

Commonly, the swappable assembly (4) is provided therein with a backup power supply compartment generally for a power supply device (535) comprising commercially available rechargeable batteries and providing electrical connection through the power supply board (53) so as to provide additional power supply, in condition of shortage supply of power, for driving the entire home-care surveillance and monitoring system.

Further, with the functions provided by the above-discussed modules, the gas sensor assembly (514) detects harmful gases in the environment and the smoke sensor assembly (513) detects smokes in the environment such that the smoke/gas alarm light (523) corresponding thereto transmits a corresponding message to a wireless device and starts to flash for alarming and broadcasting for alarming when a detection result exceeds a threshold, wherein when the most dangerous level has been reached, the detection data and image are transmitted to a fire department. The body temperature sensor assembly (516) may detect body temperatures of individual family members and the body temperature indicator (527) corresponding thereto is lit when operating normally. The body temperature alarm light (528) is generally blue and gives off alarms only when the body temperature of the family members exceed a predetermined reference. The smoke indicator (526) and the gas indicator (524) are lit in normal operations for recognition of normal operations thereof. The two detection or sensor modules are maintained in an activated condition and kept in operation with higher priority in case of power failure or shortage or insufficiency of power supply for purposes of preventing common catastrophes or hazards, such as fire and gas explosion, in order to provide a safe household and living environment. The air sensor module (515) primarily functions to track or identify air or atmosphere quality and generally conducts detection and monitoring of suspending particles contained in air or atmosphere and transmits related messages to a wireless device, and the air quality indicator (525) that is provided to correspond thereto generally gives off different colors of light for extended periods of time to indicate the current condition of air quality, wherein blue light indicates normal quality, yellow for acceptable quality, and red for poor quality, and can be set in connection with an air purifier for conducting an operation thereof according to air quality; however, the colors displayed can be changed according to actual needs or can be variably set during the manufacturing thereof, not limited to the colors mentioned above. The humidity/temperature sensor module (512) conducts detection and monitoring of temperature and humidity of air or atmosphere and the detected data are fed back to the main control panel (3), allowing the messages to be further transmitted to the wireless device, and the temperature/humidity indicator (522), which is provided to correspond thereto, is generally lit during a normal operation thereof to ensure the normal operation of the detection function thereof and can be set in connection with a dehumidifier for conducting an operation thereof according to temperature/humidity of air; however, the above-discussed detection assemblies can be increased or decreased according to actual needs or can be variably set during the manufacturing thereof, not limited to those shown in the drawings.

The chip included in the main control panel (3) is provided for process information captured or acquired by the camera (5) in order to identify the temperature or movement of a target object and determine if the target object in the environment is a human body or a pet. Further, the living organism identification assembly (511) detects the location and body performance of the target object and is generally embodied as a Doppler radar, wherein data can be acquired through the frequency of amplitude. The living organism identification assembly (511) is generally not affected by the material that makes the lighting device (1) and can be concealed in the interior thereof to make the outside appearance aesthetics.

More specifically, the operation is based on a moving signal of a high frequency band of a breath signal so that when a breath signal is identified and, based on a moving signal, it is identified according to a resident moving within a fixed period of time that the resident is in an abnormal condition. Thus, based on standing wave analysis, detection range can be expanded and high accuracy of detecting abnormality can be achieved. Information obtained with such detection can be transmitted back to the main control panel (3) to be recorded in the PHD so that in case of abnormality, images and information so detected can be transmitted to a hospital to obtain remote emergent medical treatment instructions and may also serve as surveillance for the elder and young home members in a normal condition. The IP setting indicator (521) is generally provided for indication of instruction setting. The chip of the main control panel (3) may use infrared transmission and receiving, voice or wireless control to connect with the detection module (13) to achieve automatic control of general household electric appliances, including air cooling/heating devices, thermostats, air purification devices, dehumidification devices, televisions, and lights, to allow lights to be automatically turned on when a user enters a living room and to allow the associated electrical appliance to be activated according to the setting made by a user and to have the lights and the associated electrical appliance automatically shut down when the user leaves. The main control panel (3) is provided therein with for example WIFI, Z-WAVE, ZigBee, Bluetooth, or other communication techniques and may conduct detection via connection to door/window sensors corresponding thereto and/or water pipe leaking detectors for detecting water leakage. For example, the sensors mounted to doors and windows can be connected to the main control panel (3) for identifying intrusion through the doors and windows. In case of invasion, the main control panel (3) activates the camera (5) to conduct image/video recording and gives an instruction to set the LEDs (31) to give off light and drives the speaker (532) and the microphone (533) to start up broadcasting and notifying the user or reporting to police stations to greatly improve home security, and may control the operation of peripheral lighting devices or fixtures through Z-WAVE and ZigBee.

The above-described structural arrangement is made such that flashing reminders by means of the detection module (51) and the ancillary module (52), in combination with processing of feedback data carried out by the main control panel (3), make it possible to effectively maintain a secured and comfortable living environment in the house. Further, better and wider range of surveillance or monitoring can be achieved with the panoramic camera (5), so that a user name list may be entered in advance before an event occurs to achieve prevention and in case of no response to reminders and data continuously increasing to reach an extremely dangerous level, information may be transmitted through a network to a fire department, where the information transmitted includes currently detected on-site gas concentration, address, images, or other data (such as PHD that may be transmitted to a nearby hospital or clinic where the user is registered to allow the hospital or clinic to access related information, where it is apparent that data exchange certificate may be made in advance to ensure information security or a manufacturer of the product may provide a dedicated server for such purposes), in order to allow field operation personnel to fully realize and handle the on-site conditions.

Figure 3:
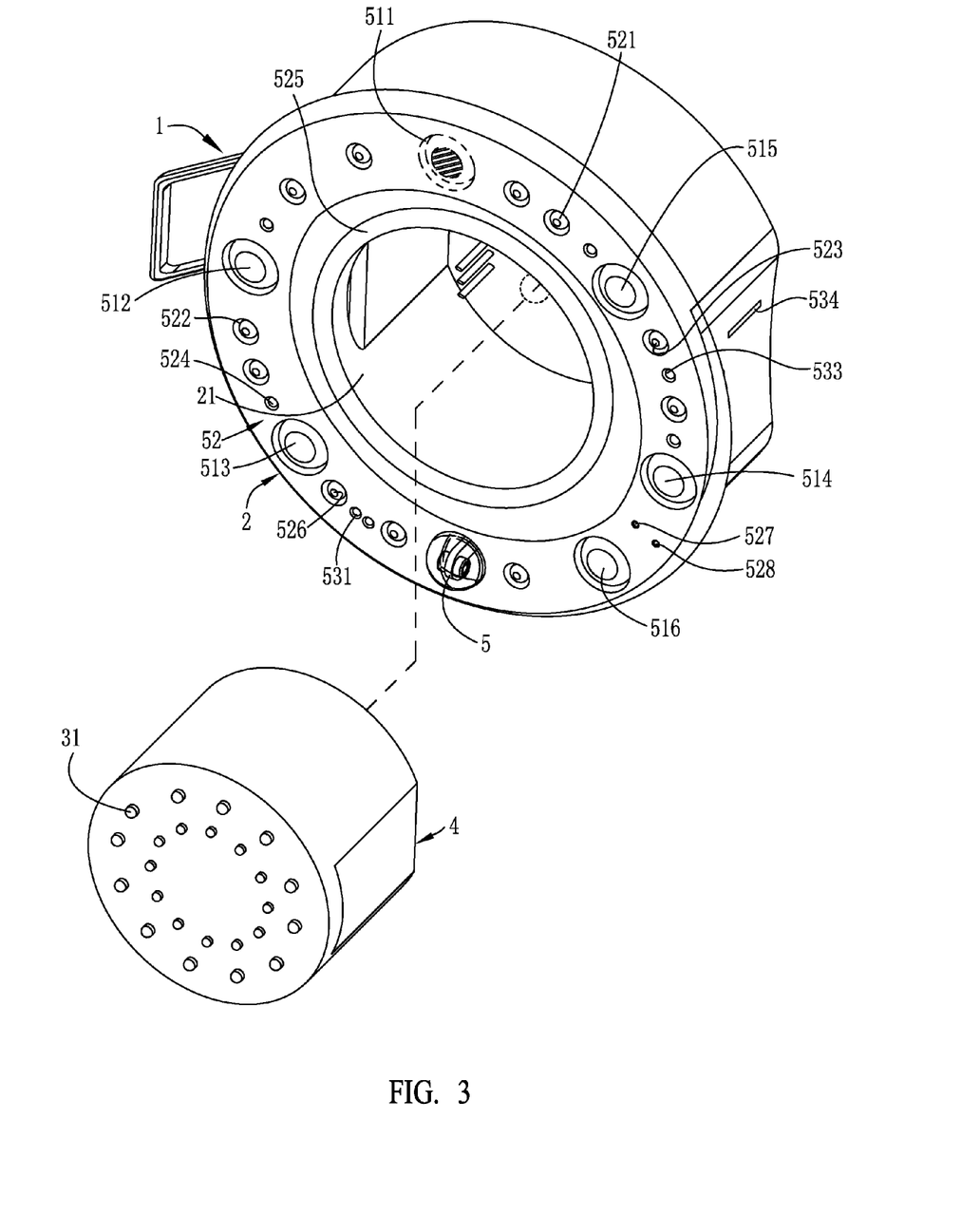
FIG. 3 is a schematic view showing a second embodiment of the present invention.

In a second embodiment of the present invention, a major change is that the plurality of LEDs (31) that are arranged in the base (2) in the embodiment shown in FIG. 1 are switched, in position, with the detection module (51) that is arranged on the swappable assembly (4) and also, due to the switching of these structures, the main control panel (3) is re-arranged to be located in the base (2), as shown in FIG. 3, to allow the base (2) to possess a detection function of panoramic surveillance and monitoring. When illumination is needed, immediate expansion for such a function that is not originally provided can be realized through installation of the swappable assembly (4) and flexibility of use and operation can be obtained by means of the main control panel (3).

Figure 4:
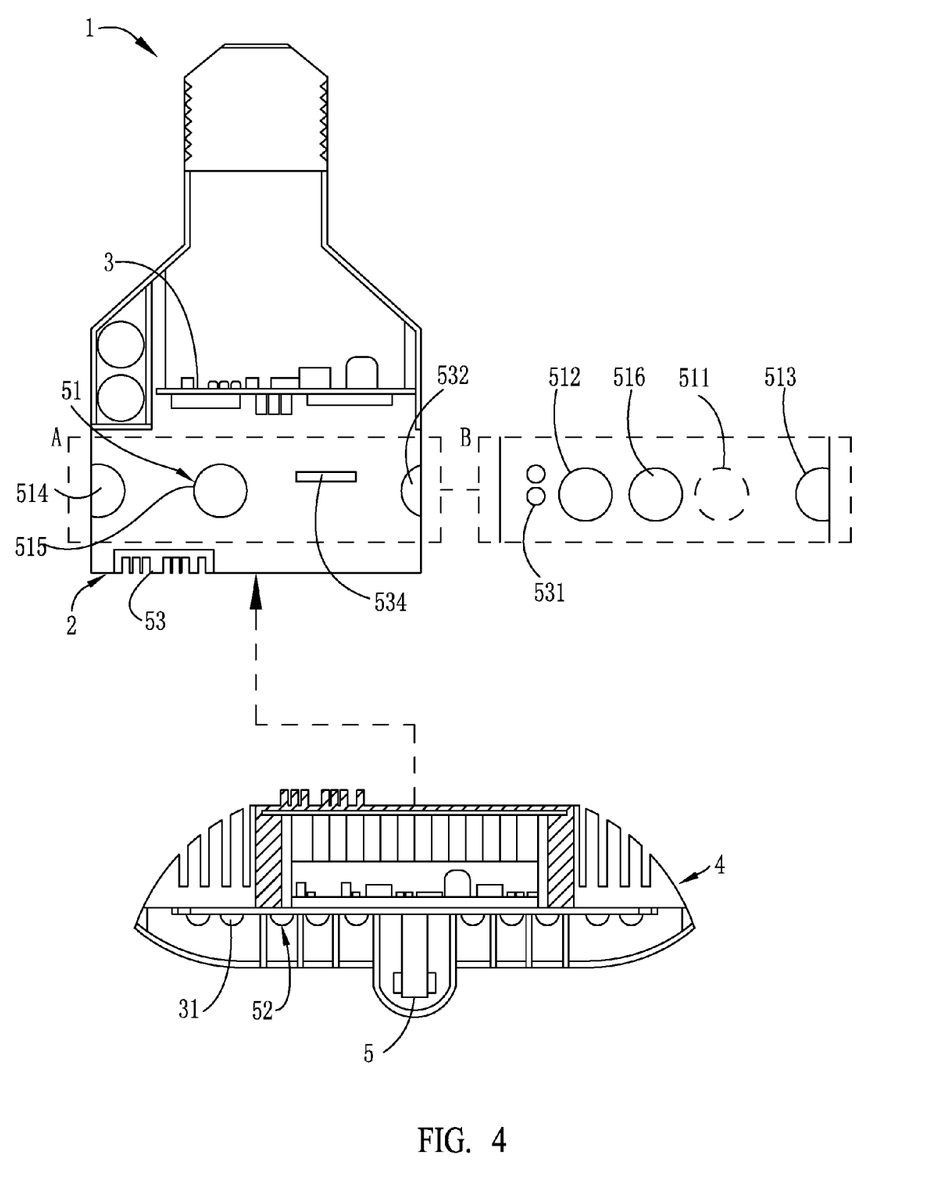
FIG. 4 is a schematic view showing structural connection of a third embodiment of the present invention.
Figure 5:
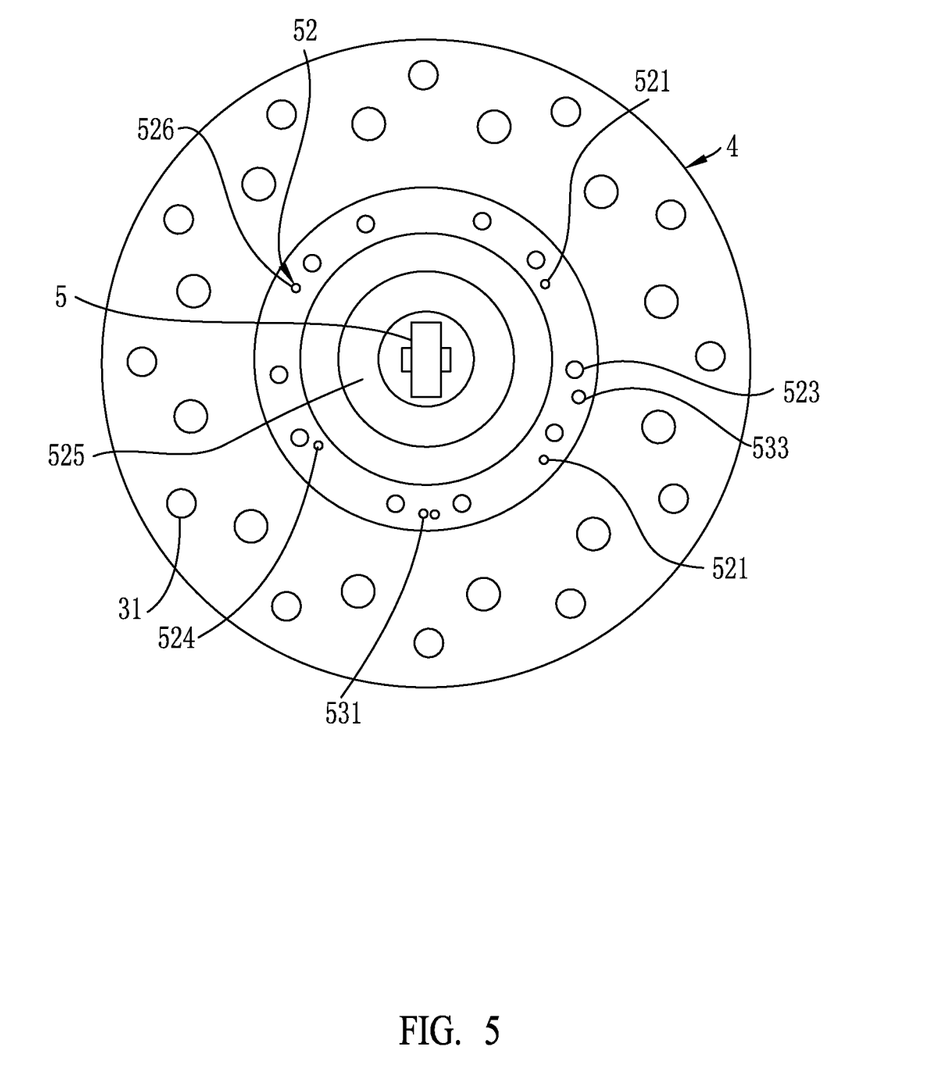
FIG. 5 is a schematic bottom view of the third embodiment of the present invention.
Figure 6:
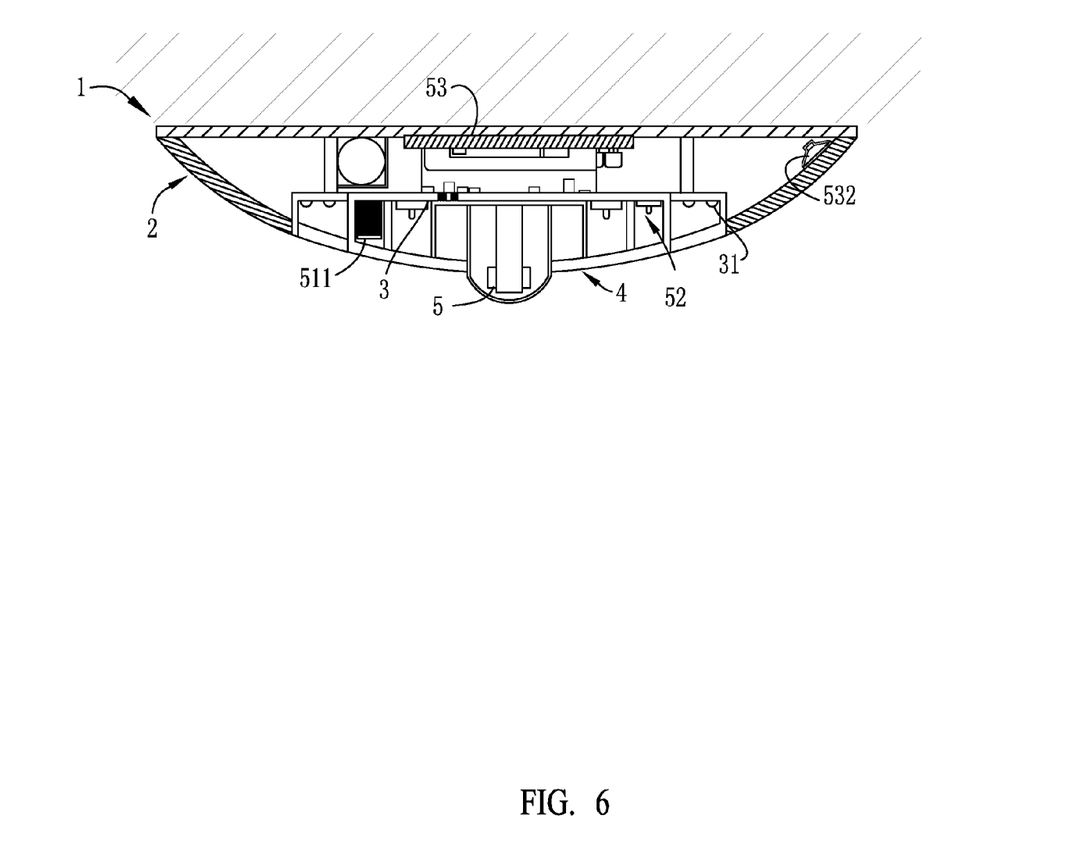
FIG. 6 is a schematic view illustrating a ceiling light as a fourth embodiment of the present invention.
Figure 7:
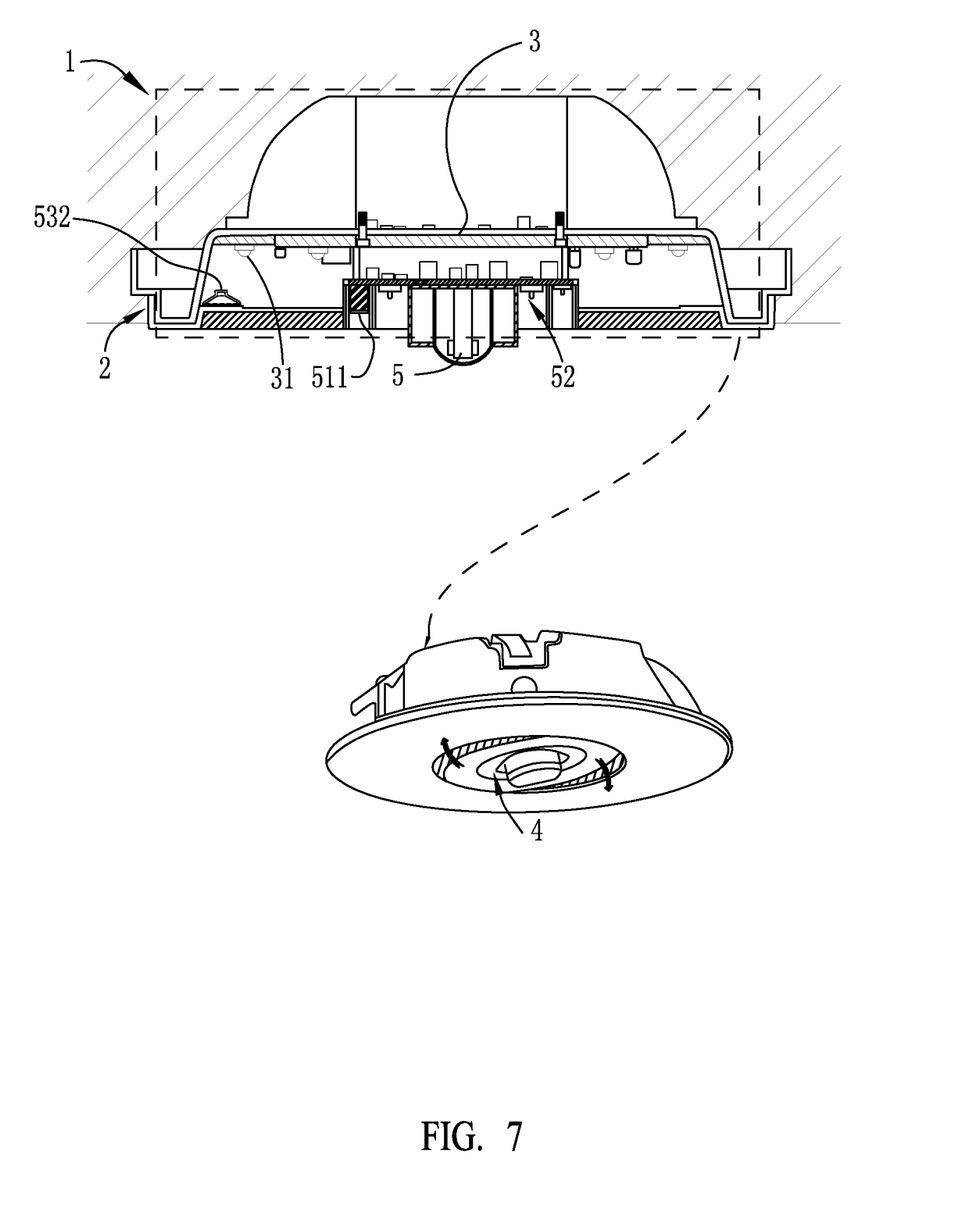
FIG. 7 is a schematic view illustrating an embedded light as a fifth embodiment of the present invention.
Figure 8:
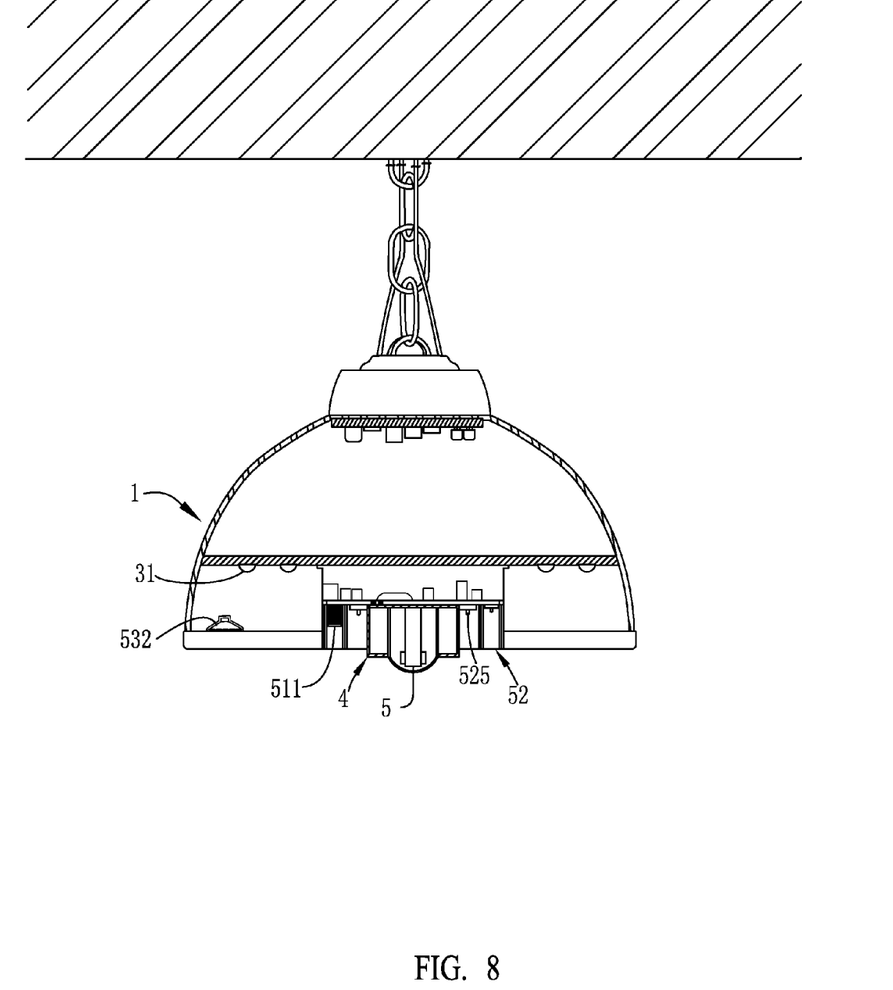
FIG. 8 is a schematic view illustrating a bay light as a sixth embodiment of the present invention.
Figure 9:
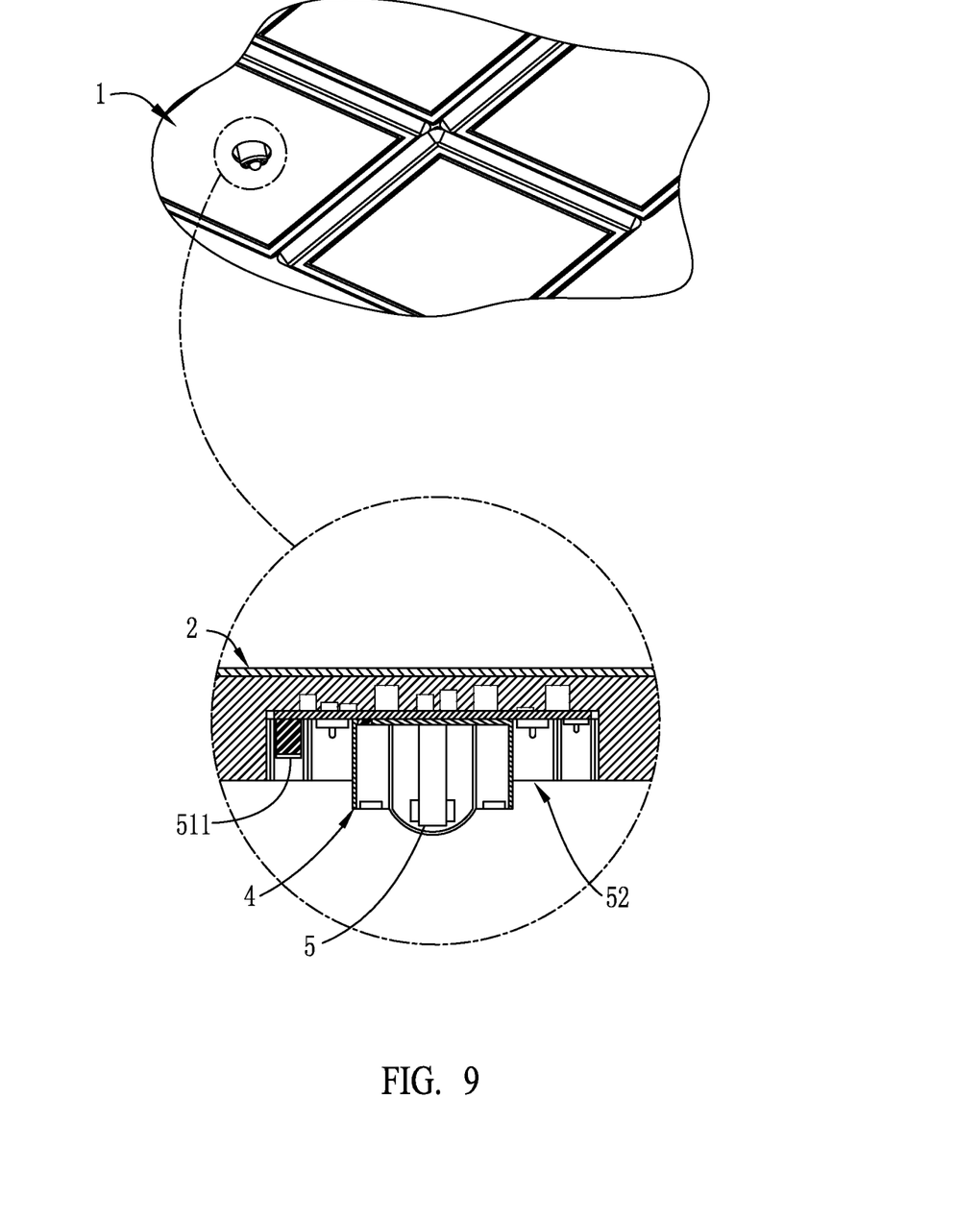
FIG. 9 is a schematic view illustrating a flat fluorescent light as a seventh embodiment of the present invention.

Further available is that the insert-to-dispose structure of the swappable assembly (4) is applicable to different types of lighting fixtures or device. Reference is now made to FIGS. 4-9, and shown in sequence in these drawings are a bulb light, a ceiling light, an embedded light, a bay light, and a flat fluorescent light, wherein the bulb light is structured to have the detection module (51) and the ancillary module (52) mounted to a lateral of the base (2), wherein a phantom line frame A and a phantom line frame B shown in FIG. 4 are plan views of two halves of the base (2) being bisected at an angle of 180 degrees, while the swappable assembly (4) shown in a lower part of the drawings is connectable, through multiple pin terminals, to the base (1) in an insert-to-connect manner, so that expansion can be achieved with the simplest manner and difficulty of maintenance operations can be greatly reduced. For the suspension light, the swappable assembly (4) is directly combined with the LEDs (31) that are provided for illumination so that adjustment can be made through mounting/dismounting and the swappable assembly (4) may be of a design that exhibit arbitrarily twistable adjustment to provide a better range of illumination. The other lights have similar arrangement in respect of the structures thereof so that repeated description will be omitted.

Figure 10:
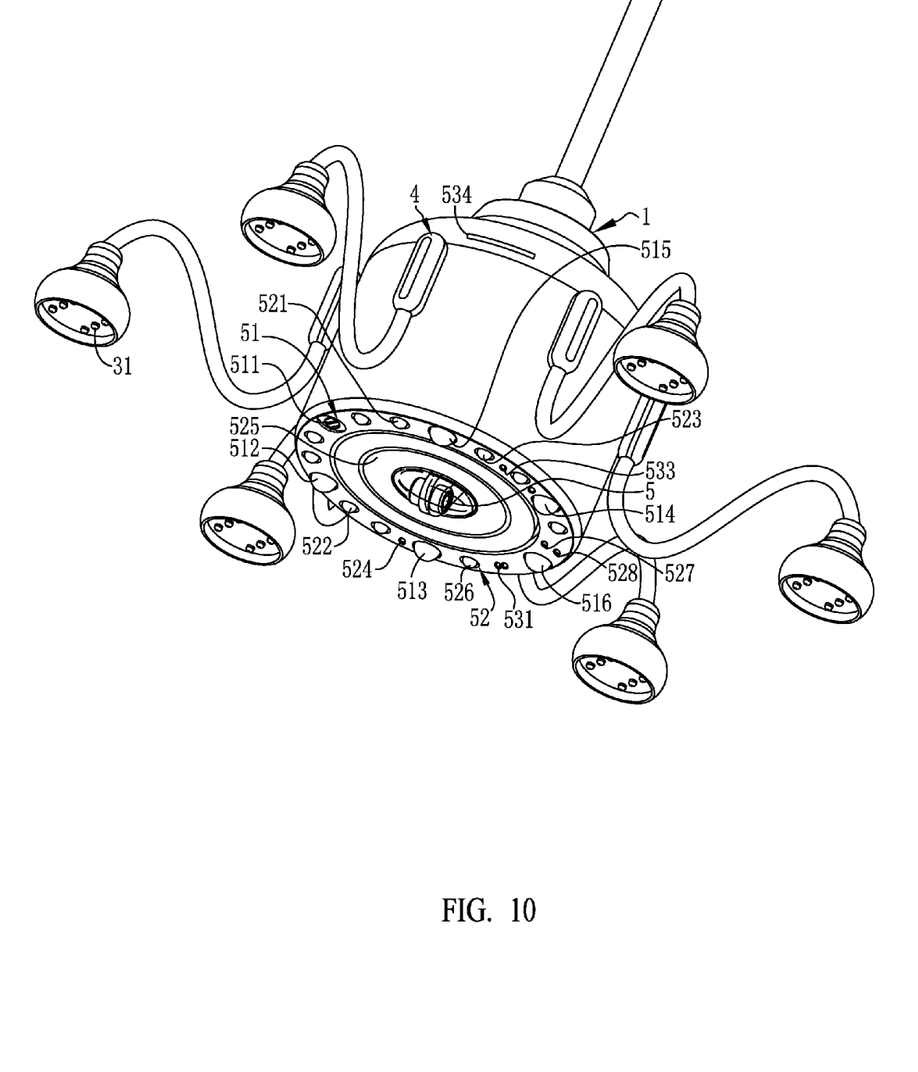
FIG. 10 is a schematic view illustrating a suspension light as an eighth embodiment of the present invention.

Further, as shown in FIG. 10, a lighting device (1) is shown as a suspension light. The lighting device (1) comprises a centrally located base (2) and a plurality of lighting assemblies (6) arranged to be circumferentially around a circumference of the base (2). The base (2) is provided, in the interior thereof, with a main control panel (3). The main control panel (3) is electrically connected with the base (2) and the lighting assemblies (6). The base (2) is provided, at a central position thereof, with a camera (5), and a detection module (51) and a ancillary module (52) that are swappable or replaceable are arranged circumferentially around a circumference of the camera (5) and are electrically connected, via the main control panel (3), to the base (2) and the lighting assemblies (6) for conducting panoramic surveillance and monitoring and detection of environment conditions, and also allowing the LEDs (31) arranged in the lighting assemblies (6) to access environment information from the detection module (51) and the ancillary module (52) through the main control panel (3) as feedback for conducting related operations. Besides being mounted to face upwards or downwards, the lighting assemblies (6) can be mounted, in an adjustable manner, by using an elastic material, not limited to what illustrated in the drawings.

Figure 11:
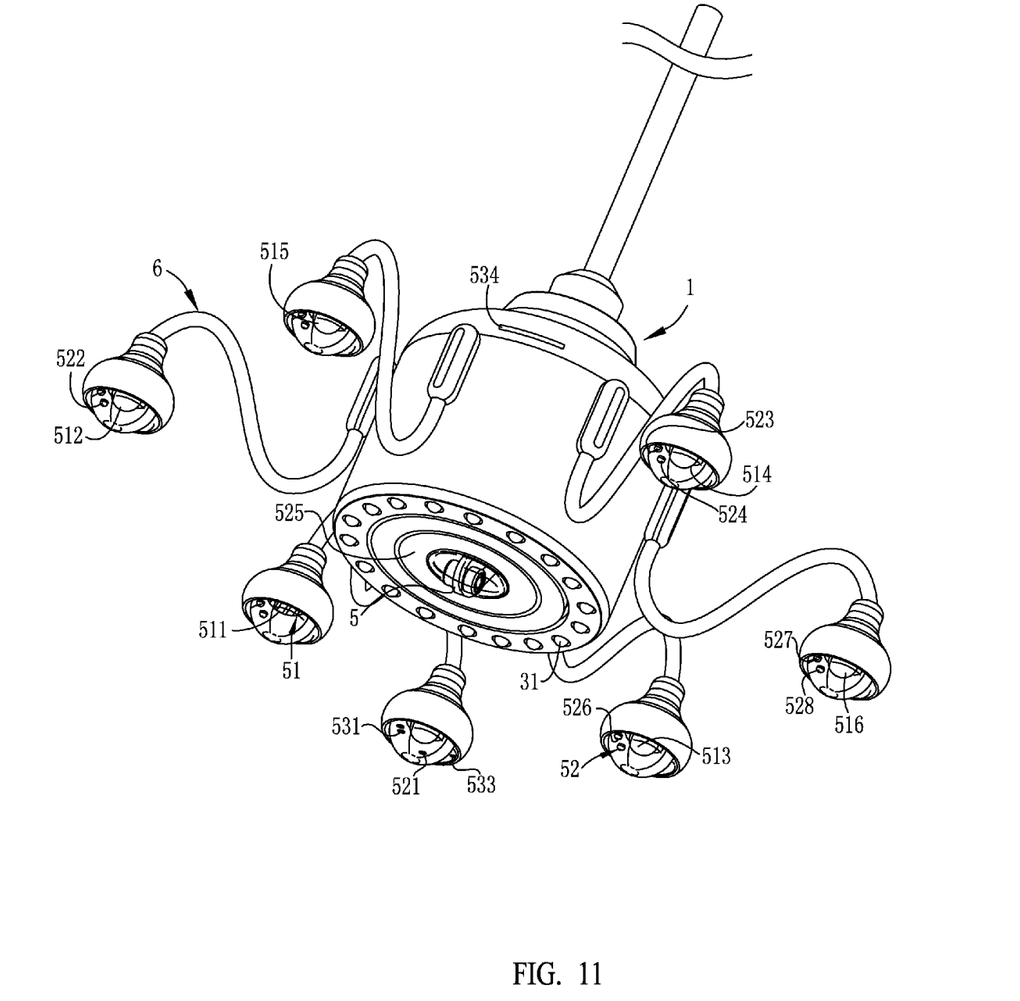
FIG. 11 is a schematic view illustrating a suspension light as a ninth embodiment of the present invention.
Figure 12:
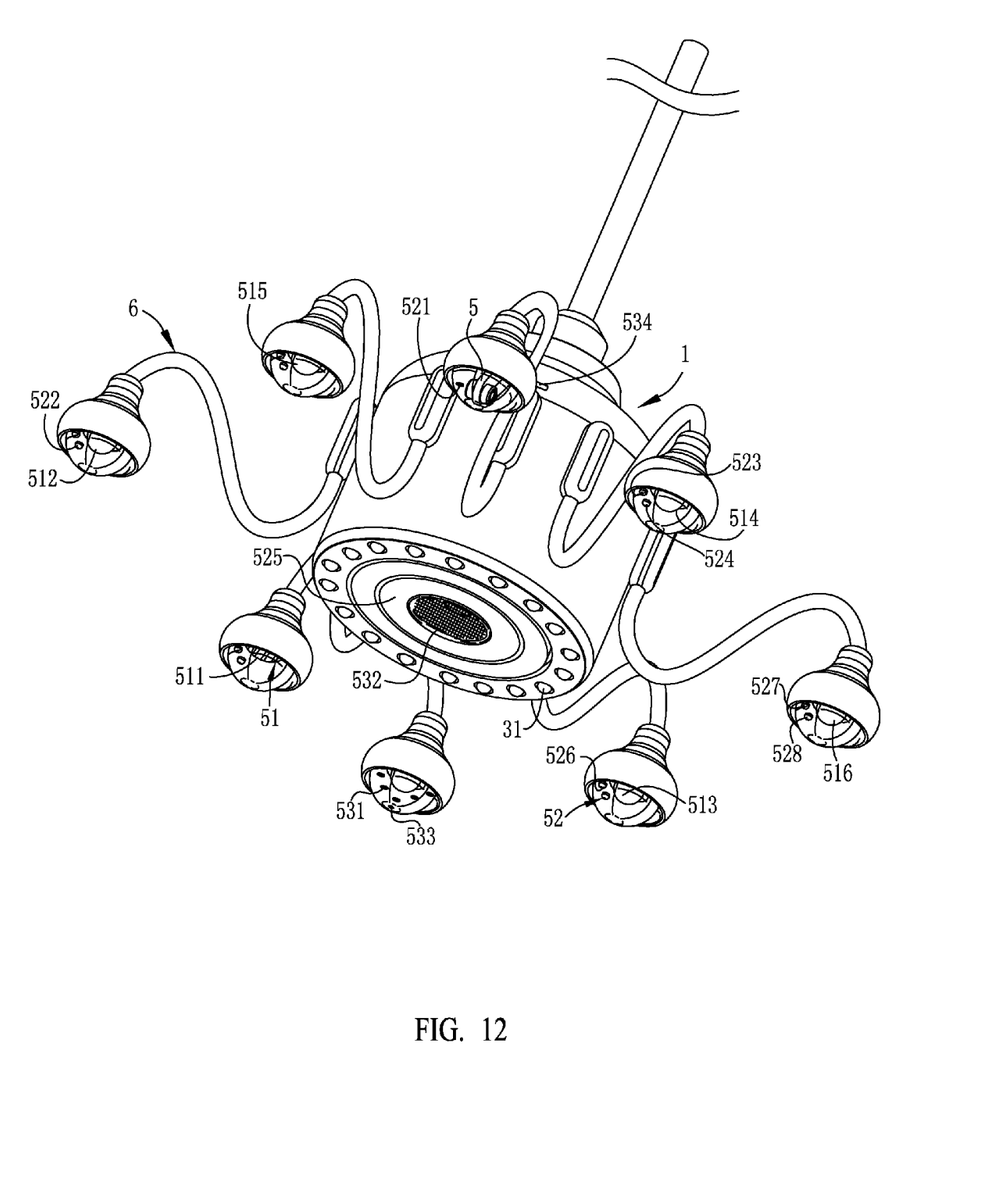
FIG. 12 is a schematic view illustrating a suspension light as a tenth embodiment of the present invention.
Figure 13:
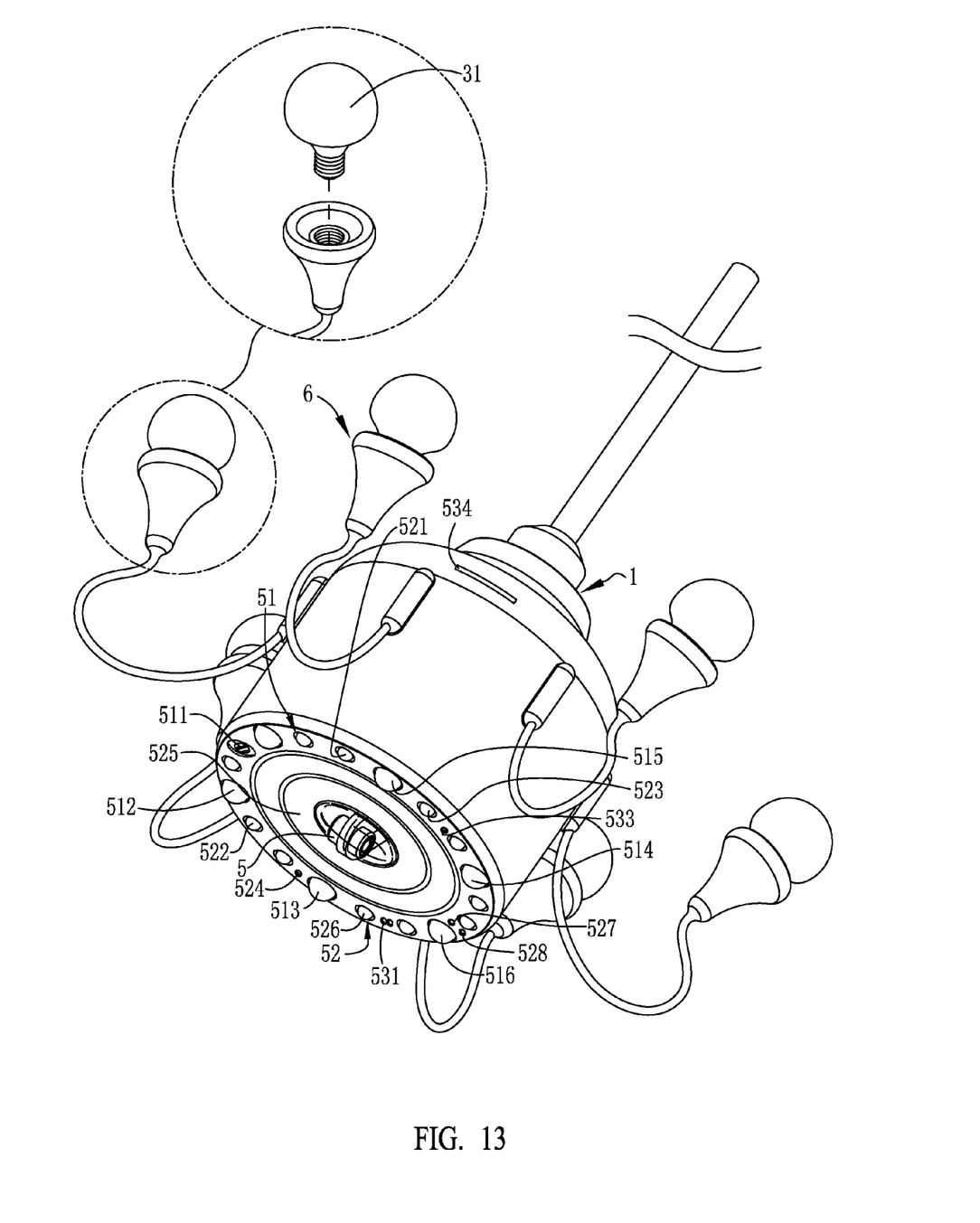
FIG. 13 is a schematic view illustrating a suspension light as an eleventh embodiment of the present invention.

In the illustrations of FIGS. 11-13, the camera (5) that is provided in the base (2) is maintained unchanged, while the detection module (51) and the ancillary module (52) that are arranged in a circumference of the camera (5) are re-arranged to be mounted to the lighting assemblies (6) and allow for adjustment for increasing or decreasing according to actual needs or can be variably set during the manufacturing thereof, and the circumference of the camera (5) is re-arranged to receive LEDs (31) mounted thereon. Or, alternatively, as shown in FIG. 12, the camera (5) is re-arranged to be mounted to the lighting assemblies (6), while the location where the camera (5) is originally disposed is re-arranged to receive a speaker (532) or other detection module (51) or the ancillary module (52) to mount thereto, but not limited thereto. FIG. 13 provides an arrangement where the lighting assemblies (6) are each formed of a bulb light that is commercially available and formed by packaging LEDs (31), or a regular bulb light. The variations made in the above-described structure can help the manufacturers to conduct a manufacturing process for adjusting according to orders of various models.

In summary, the present invention provides a modularized smart home-care lighting device, which allows for easy connection through the base (2) and the swappable assembly (4) and allows for expansion of surveillance range and acquisition of non-originally-included functions through electrical connection with and driven by a main control panel (3). And, also, surveillance and monitoring of body security of individual family members through management and collaboration through an interior chip, and combination with household electrical appliances and communication is available to establish inter-connection and collaborative operations. In addition, the present invention is more economic as compared to home care devices of the same types and allows for accurate detection without installation of additional detection devices and also allows for establishing personal data, providing richer utilization in smart home applications.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A modularized smart home-care lighting device, comprising:
    a lighting device, which comprises a base, a plurality of light-emitting diodes (LEDs) arranged in the base, and an insertion slot arranged in the base for hot pluggability; and
    a swappable assembly, which comprises a main control panel arranged inside the swappable assembly, a camera arranged at a front end of the interior of the swappable assembly, and a detection module and an ancillary module arranged circumferentially around a circumference of the camera,
    wherein the insertion slot receives installation of the swappable assembly therein to form connection therewith and electrical connection allows the camera to provide panoramic surveillance and monitoring and synchronously driving the detection module and the ancillary module, and transmitting information to the main control panel to allow the main control panel to feed back a corresponding operation.

2. The modularized smart home-care lighting device according to claim 1, wherein the LEDs comprise homogeneous arrangement of cold light and warm light and are arranged circumferentially around a circumference of the insertion slot.

3. The modularized smart home-care lighting device according to claim 1, wherein the detection module further comprises:
    a living organism identification assembly that detects a location of a target object;
    a humidity/temperature sensor assembly that detects temperature/humidity of an environment outside the lighting device;
    a smoke sensor assembly that detects smokes outside the lighting device;
    a gas sensor assembly that detects harmful gases outside the lighting device;
    an air sensor assembly that detects contents of suspending particles in the environment outside the lighting device;
    a body temperature sensor assembly that detects body temperatures of family member in the environment outside the lighting device;
    wherein all the assemblies feed information back to the main control panel for identification of environment setting references to activate and de-activate a corresponding function.

4. The modularized smart home-care lighting device according to claim 1, wherein the ancillary module further comprises:
    an IP setting indicator, a temperature/humidity indicator, a smoke alarm light, a gas indicator, an air quality indicator, a smoke indicator, a body temperature indicator; and
    a body temperature alarm light, wherein all the indicators are driven through information detected by the detection modules and fed back to the main control panel to be determined thereby in order to be lit for indication.

5. The modularized smart home-care lighting device according to claim 1, further comprising:
    a power supply board, the power supply board being electrically connected with the main control panel; and
    a rechargeable battery based power supply device that supplies additional power during insufficiency of power supply.

6. The modularized smart home-care lighting device according to claim 1, wherein the detection module, the ancillary module, and the camera are selectively to be installed as a single chip or multiple chips.

7. A modularized smart home-care lighting device, comprising:
    a lighting device, which comprises a centrally-located base and a plurality of lighting assemblies circumferentially arranged in a circumference of the base, the base comprising a main control panel arranged therein, the main control panel being electrically connected with the base and the lighting assemblies; and
    a camera, which is arranged at a central position of the base, wherein the camera has a circumference in which replaceable detection module and ancillary module are circumferentially arranged so as to conduct panoramic surveillance and monitoring and environment condition detection through electrical connection through the main control panel, allowing a plurality of light-emitting diodes (LEDs) arranged in the lighting assemblies to conduct corresponding operation through feedback information acquired by the main control panel from the detection module and the ancillary module.

8. The modularized smart home-care lighting device according to claim 7, where the LEDs of the lighting assemblies are replaceable by one of a detection module and an ancillary module.

9. The modularized smart home-care lighting device according to claim 7, wherein the camera is re-arrangeable to be located on the lighting assemblies.

* * * * *